United States Patent
Shafaat et al.

(10) Patent No.: US 9,646,504 B2
(45) Date of Patent: May 9, 2017

(54) FLIGHT DECK DISPLAYS TO ENABLE VISUAL SEPARATION STANDARD

(71) Applicant: The Boeing Company, Chicago, IL (US)

(72) Inventors: Syed Tahir Shafaat, Everett, WA (US); Robert G. Brewer, Monroe, WA (US); David M. Myers, Marysville, WA (US); Aslaug Haraldsdottir, Woodinville, WA (US); Nory K. Nishimura, Shoreline, WA (US); Leon E. Robert, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 6 days.

(21) Appl. No.: 14/878,377

(22) Filed: Oct. 8, 2015

(65) Prior Publication Data

US 2017/0103660 A1    Apr. 13, 2017

(51) Int. Cl.
*G08G 5/04* (2006.01)
*G08G 5/00* (2006.01)
*B64D 45/04* (2006.01)

(52) U.S. Cl.
CPC .......... *G08G 5/0078* (2013.01); *B64D 45/04* (2013.01); *G08G 5/0021* (2013.01); *G08G 5/045* (2013.01)

(58) Field of Classification Search
CPC ... G08G 5/0078; G08G 5/0008; G08G 5/0021
USPC ...... 340/961, 963, 964, 945; 701/120, 4, 14, 701/300, 301; 342/29, 30
See application file for complete search history.

(56) References Cited

U.S. PATENT DOCUMENTS

| | | | | |
|---|---|---|---|---|
| 6,826,458 B2 * | 11/2004 | Horvath | ................. | G01C 23/00 244/1 R |
| 7,570,178 B1 * | 8/2009 | Whalen | ................ | G08G 5/0078 340/945 |
| 7,961,135 B2 * | 6/2011 | Smith | ..................... | G01S 7/062 342/29 |
| 8,041,504 B2 * | 10/2011 | Shafaat | ................ | G01C 23/005 340/907 |
| 8,188,889 B2 | 5/2012 | Shafaat et al. | | |
| 8,203,465 B2 | 6/2012 | Shafaat et al. | | |
| 8,315,787 B2 | 11/2012 | Shafaat et al. | | |
| 8,380,424 B2 | 2/2013 | Bushnell | | |
| 8,830,090 B2 | 9/2014 | Shafaat | | |
| 8,989,998 B2 | 3/2015 | Le et al. | | |

(Continued)

*Primary Examiner* — Toan N Pham
(74) *Attorney, Agent, or Firm* — Ostrager Chong Flaherty & Broitman P.C.

(57) ABSTRACT

Systems and methods that display information to enable a flight crew on a trailing aircraft to maintain separation behind a leading aircraft during an approach. Graphical designs are displayed on a navigation display or other display in the flight deck of the trailing aircraft to help the flight crew visually acquire the leading aircraft out the window and maintain at least a specified separation distance or spacing between the two aircraft even if visual contact is lost after the initial visual contact. A visual indication is provided on the display if that separation distance/spacing is attained. If for some reason the flight crew misses that visual indication and the trailing aircraft continues to get closer to the leading aircraft, another visual indication is provided, followed by an aural alert when a minimum safe spacing is reached.

21 Claims, 10 Drawing Sheets

(56) References Cited

U.S. PATENT DOCUMENTS

| | | | |
|---|---|---|---|
| 9,437,112 B1 * | 9/2016 | Greene | G08G 5/0021 |
| 2011/0270472 A1 | 11/2011 | Shafaat et al. | |
| 2011/0282568 A1 * | 11/2011 | Khatwa | G08G 5/0013 |
| | | | 701/121 |

* cited by examiner

FLIGHT DECK DISPLAYS TO ENABLE VISUAL SEPARATION STANDARD

BACKGROUND

The invention generally relates to systems and methods for displaying traffic information on a display unit. In particular, the disclosed embodiments relate to systems and methods for displaying air traffic on a traffic display unit, such as a navigation display located in the cockpit or flight deck of an aircraft.

The term "traffic display unit" will be used hereinafter to refer to display units that display symbols representing vehicular traffic of interest to a display unit viewer. Thus the term "traffic display unit", as used herein, includes navigation displays and other types of traffic display units onboard aircraft.

Modern aircraft typically include cockpit displays that are controlled by an information system. Cockpit displays include the basic displays that are supplied with the aircraft, and other add-on displays which vary in their degree of integration with the physical aircraft structure and aircraft systems. In a modern electronic cockpit, the flight instruments typically include a so-called "navigation display". A navigation display (which may be adjacent to the primary flight display) along with navigational information may show the current position of all aircraft within the display range and information. Current implementations of a navigation display range selection are typically in whole number increments (for example, 640, 320, 160, 80, 40, 20, and 10 nautical mile ranges) such that intermediate display range selections between the whole number increments are not utilized.

Many modern aircraft are equipped with a traffic collision avoidance system (TCAS) that monitors surrounding airspace for similarly TCAS-equipped aircraft, independent of air traffic control, and issues an alert when a conflict (i.e., a potential collision threat) with another aircraft is identified. (The term "conflict" as used herein is an event in which two aircraft experience a loss of minimum separation. A conflict occurs when the distance between aircraft in flight violates a defining criterion, usually a minimum horizontal and/or minimum vertical separation. These distances define an aircraft's protected zone, a volume of airspace surrounding the aircraft which should not be infringed upon by any other aircraft.) Each TCAS-equipped aircraft interrogates all other aircraft in a specified range, and all other aircraft reply to the interrogations which they receive. The TCAS comprises a processor, a directional antenna mounted on the top of the aircraft, an omnidirectional or directional antenna mounted on the bottom of the aircraft, and a traffic display in the cockpit. The TCAS traffic display may be integrated into the navigation display or some other cockpit display. The TCAS processor builds a three-dimensional map of aircraft in the airspace, incorporating their range, closure rate, altitude and bearing; then the TCAS processor determines if a conflict exists by extrapolating current range and altitude difference to anticipated future values and determining whether another aircraft has entered a protected volume of airspace that surrounds ownship. The extent of the protected volume of airspace will depend on the altitude, groundspeed and heading/track of the aircraft involved in the encounter.

More specifically, the TCAS processor executes a program that performs a conflict detection algorithm. Based on parameters applied by the conflict detection algorithm, the TCAS gives an alert when several conditions occur: (1) Entry by an intruder into a protected airspace (called the Traffic Advisory region) surrounding the ownship causes the TCAS onboard that aircraft to issue a Traffic Advisory (hereinafter "TA"). (2) If the opposing traffic is within the protected airspace and the TCAS detects that the heading/track, climb rate, and closure rate of the opposing traffic may cause it to collide with the ownship; the TCAS issues a Resolution Advisory (hereinafter "RA").

In addition, a significant number of aircraft flying today are also equipped with the Automatic Dependent Surveillance-Broadcast (ADS-B) system and by year 2020 all aircraft operating within the airspace of the United States must be equipped with some form of ADS-B. The ADS-B system enhances safety by making an aircraft visible in real-time to air traffic control and to other suitably equipped aircraft. The ADS-B technology enhances safety by enabling display of traffic positions and other data, in real-time, to Air Traffic Control (ATC) and to other appropriately equipped ADS-B aircraft, with position (i.e., latitude, longitude and altitude), velocity (i.e., groundspeed) and other data being transmitted every second. Using this information, a traffic processor onboard a receiving aircraft can calculate the current heading/track and a future position of a transmitting aircraft. When using an ADS-B system, a pilot is able to receive traffic information about aircraft in his vicinity and at farther distances. The ADS-B system relies on two avionics components—a high-integrity GPS navigation source and a data link (ADS-B unit) connected to other aircraft systems. ADS-B enables cockpit display of traffic information for surrounding aircraft, including the identification, position, altitude, heading/track and groundspeed of those aircraft. With the use of ADS-B traffic, the flight crew is given more information about traffic heading/track, groundspeed and position. Using that information, the flight crew must perform monitoring tasks to keep track of traffic in their vicinity and then estimate whether traffic may cross their path in the future or cause a TA/RA conflict in the future.

In today's airspace, air traffic controllers instruct the flight crew to maintain visual separation from the aircraft in front (referred to herein as "the leading aircraft") for approach and landing. In such clearances, the flight crew is responsible for maintaining separation from the aircraft in front. If the flight crew loses visual contact with the leading aircraft due to small patches of clouds or the background lights at night time, the flight crew is expected to execute a missed approach, resulting in extra fuel cost and time.

Accordingly, there is a need for electronic traffic display units that operate in accordance with associated alerting algorithms to enable the flight crew to continue the approach and land the aircraft even if they lose visual contact with the a leading aircraft.

SUMMARY

The subject matter disclosed in detail below is directed to systems and methods that display information to enable a flight crew on a trailing aircraft to maintain separation behind a leading aircraft during an approach. More specifically, the systems disclosed herein comprise electronic traffic display units that operate in accordance with associated alerting algorithms to enable the flight crew to continue the approach and land the aircraft even if they lose visual contact with the leading aircraft.

In accordance with the embodiments disclosed herein, graphical designs (referred to herein as "symbology") are displayed on a navigation display or other display in the flight deck of a trailing aircraft to help the flight crew visually acquire a leading aircraft out the window and maintain at least a specified separation distance or spacing between the two aircraft even if visual contact is lost after the initial visual contact. A visual indication is provided on the display if that separation distance/spacing is attained. If for some reason the flight crew misses that visual indication and the trailing aircraft continues to get closer to the leading aircraft, another visual indication is provided, followed by an aural alert when a minimum safe spacing is reached.

The display systems disclosed in detail below comprise a visual/graphical air traffic display software tool that can be used for maintaining at least a specified separation distance between the leading and trailing aircraft. The tool displays a first symbol (e.g., a circle or an arc) that indicates a desired (e.g., selected by a pilot) "no closer than" separation distance between the leading and trailing aircraft. The tool may further display a second symbol that indicates a mandatory minimum separation distance which is less than the pilot-selected separation distance. In accordance with one embodiment, the tool is also configured to use the current and predicted (i.e., future) positions of the leading and trailing aircraft to issue the following alerts: (1) a first alert when the calculated current separation distance of the leading and trailing aircraft decreases sufficiently that the calculated current separation distance differs from the pilot-selected separation distance by less than a first specified threshold; (2) a second alert when their calculated current separation distance is decreasing at a sufficiently fast rate that the minimum separation distance will be reached within a specified time interval; and (3) a third alert when the calculated current separation distance decreases sufficiently that it differs from the minimum separation distance by less than a second specified threshold (which may be the same as the first specified threshold). Each alert may take the form of a visual or aural alert. In accordance with various embodiments, the first and second alerts are visual and the third alert is aural. In accordance with one embodiment: (1) the first alert takes the form of a change in the coloration of the first symbol (e.g., a circle or a circular arc) representing the specified pilot-selected separation distance (for example, the coloration change may be a transition from green or yellow to amber or red); (2) the second alert takes the form of the sudden display of the second symbol (e.g., a circle or a circular arc) representing the specified minimum separation distance); and (3) the third alert takes the form of an aural alert warning the flight crew that the minimum separation distance (also referred to herein as the "minimum safe spacing") has been reached.

The systems disclosed herein provide the capability to achieve and/or maintain consistent spacing over a certain point after takeoff, en route, or prior to landing to increase airport capacity, resulting in fuel savings and reduced $CO_2$ emissions.

One aspect of the subject matter disclosed in detail below is a method for displaying traffic information on a traffic display unit onboard a trailing aircraft, comprising: (a) acquiring data representing a current position and a current heading of the trailing aircraft; (b) acquiring data representing a current position and a current heading of a leading aircraft flying in front of the trailing aircraft; (c) displaying first symbology that indicates the current position and current heading of the leading aircraft relative to a frame of reference; (d) displaying a second symbology that indicates the current position and current heading of the trailing aircraft relative to the frame of reference; (e) displaying third symbology representing a reference separation distance between the leading and trailing aircraft; (f) calculating a current separation distance between the leading and trailing aircraft based on the current positions of the leading and trailing aircraft; and (g) generating an alert in response to the current separation distance calculated in step (f) being within a specified tolerance of the reference separation distance.

Another aspect of the subject matter disclosed in detail below is a system for displaying traffic information onboard a trailing aircraft, comprising a display unit and a computer system configured to perform the following operations: (a) acquiring data representing a current position and a current heading of the trailing aircraft; (b) acquiring data representing a current position and a current heading of a leading aircraft flying in front of the trailing aircraft; (c) causing the display unit to display first symbology that indicates the current position and current heading of the leading aircraft relative to a frame of reference; (d) causing the display unit to display a second symbology that indicates the current position and current heading of the trailing aircraft relative to the frame of reference; (e) causing the display unit to display third symbology representing a reference separation distance between the leading and trailing aircraft; (f) calculating a current separation distance between the leading and trailing aircraft based on the current positions of the leading and trailing aircraft; and (g) causing an alert to be generated in response to the current separation distance calculated in operation (f) being within a specified tolerance of the reference separation distance. The third symbology may comprise a circle or circular segment centered at one of the first and second symbologies In accordance with some embodiments of the method and system described in the preceding two paragraphs, the alert is a visible change to the displayed information (for example, a change in coloration of the third symbology). In accordance with other embodiments, the alert is an aural alert.

A further aspect of the subject matter disclosed in detail below is a method for displaying traffic information on a traffic display unit onboard a trailing aircraft, comprising: (a) acquiring data representing a current position, a current speed and a current heading of the trailing aircraft; (b) acquiring data representing a current position, a current speed and a current heading of a leading aircraft flying in front of the trailing aircraft; (c) displaying first symbology that indicates the current position and current heading of the leading aircraft relative to a frame of reference; (d) displaying a second symbology that indicates the current position and current heading of the trailing aircraft relative to the frame of reference; (e) displaying third symbology representing a first reference separation distance between the leading and trailing aircraft; (f) calculating a future time at which a future separation distance between the leading and trailing aircraft will be equal to a second reference separation distance less than the first reference separation distance based on the current positions and current speeds of the leading and trailing aircraft; and (g) generating an alert in response to the future time calculated in step (f) being less than a specified tolerance.

Yet another aspect of the subject matter disclosed in detail below is a system for displaying traffic information onboard a trailing aircraft, comprising a display unit and a computer system configured to perform the following operations: (a) acquiring data representing a current position, a current speed and a current heading of the trailing aircraft; (b) acquiring data representing a current position, a current speed and a current heading of a leading aircraft flying in front of the trailing aircraft; (c) causing the display unit to display first symbology that indicates the current position and current heading of the leading aircraft relative to a frame of reference; (d) causing the display unit to display a second symbology that indicates the current position and current heading of the trailing aircraft relative to the frame of reference; (e) causing the display unit to display third symbology representing a first reference separation distance between the leading and trailing aircraft; (f) calculating a future time at which a future separation distance between the leading and trailing aircraft will be equal to a second reference separation distance less than the first reference separation distance based on the current positions and current speeds of the leading and trailing aircraft; and (g) causing an alert to be generated in response to the future time calculated in operation (f) being less than a specified tolerance.

In accordance with some embodiments of the method and system described in the preceding two paragraphs, step or operation (g) comprises displaying fourth symbology representing the second reference separation distance. That fourth symbology may comprise a circle or circular segment centered at one of the first and second symbologies.

A further aspect of the disclosed subject matter is a system for displaying traffic information onboard a trailing aircraft, comprising a display unit, a computer system configured to control the display unit, and a visual/graphical air traffic display software tool running on the computer system and configured to perform the following operations: controlling the display unit to display a first symbol that indicates a pilot-selected separation distance between a leading aircraft and a trailing aircraft; monitoring current and predicted separation distances of the leading and trailing aircraft; and using the current and predicted separation distances of the leading and trailing aircraft to issue the following alerts: (1) a first alert when the current separation distance of the leading and trailing aircraft decreases sufficiently that the current separation distance differs from the pilot-selected separation distance by less than a first specified threshold; (2) a second alert when the current separation distance is decreasing at a sufficiently fast rate that a minimum separation distance less than the pilot-selected separation distance will be reached within a specified time interval; and (3) a third alert when the current separation distance decreases sufficiently that it differs from the minimum separation distance by less than a second specified threshold. The issuing of the second alert comprises controlling the display unit to display a second symbol that indicates the minimum separation distance. The first alert may take the form of a change in the coloration of the first symbol, and the third alert may take the form of an aural alert.

Other aspects of systems and methods for displaying information to enable a flight crew to maintain separation behind a leading aircraft in the event that visual contact is lost during an approach are disclosed in detail below.

BRIEF DESCRIPTION OF THE DRAWINGS

Reference will hereinafter be made to the drawings in which similar elements in different drawings bear the same reference numerals.

DETAILED DESCRIPTION

Embodiments of systems and methods for displaying traffic information on a traffic display unit onboard an aircraft (also referred to herein as "ownship") are disclosed below. The displayed traffic information may include the current and future positions of ownship and the current positions of TCAS and ADS-B traffic in the vicinity of ownship. The position and orientation of symbols representing other aircraft are a function of parametric information broadcast by those aircraft and processed by a computer system onboard ownship that controls the traffic display unit. In the particular examples disclosed herein, the traffic display unit is a navigation display or any other display unit in the flight deck where air traffic is displayed on an aircraft.

As disclosed above, ADS-B is a surveillance technology for tracking aircraft. The ADS-B equipment installed on an aircraft periodically broadcasts its position, velocity, altitude, and identification among other information, at a high rate. This information is used by the air traffic controller for surveillance and can also be used by all other aircraft in the vicinity for traffic situational awareness. The particular embodiments of traffic display systems disclosed herein will allow additional use of information derived from ADS-B. However, the concepts disclosed here can also be applied to traffic display systems that receive traffic information in ways other than via ADS-B.

In aircraft equipped with an ADS-B reception function, the onboard system(s) have access to the aircraft's own current position (latitude, longitude, and altitude), true and calibrated airspeed, and groundspeed, along with other needed parameters. The ADS-B aircraft can also receive similar data from other aircraft in the vicinity, in particular from the assigned leading aircraft.

In this airspace management environment and with the above-described functionality available onboard the aircraft, a traffic controller would clear the flight crew for Visual Approach behind another aircraft (hereinafter "leading aircraft") as it is done today. Upon receiving the clearance, the flight crew would enter the flight identification of the leading aircraft; and a spacing distance that they want to maintain or not get closer than from the leading aircraft.

In accordance with some embodiments, a graphical display can be used to indicate to the flight crew the following information: (1) the current position of the leading aircraft relative to the trailing aircraft; (2) the distance that the flight crew wants to remain behind the leading aircraft; (3) an indication if the closure rate between the two aircraft is high and the trailing aircraft will be closing in to the minimum distance allowed; and (4) an alert when the trailing airship gets too close or equal to the minimum distance allowed.

Figure 1:
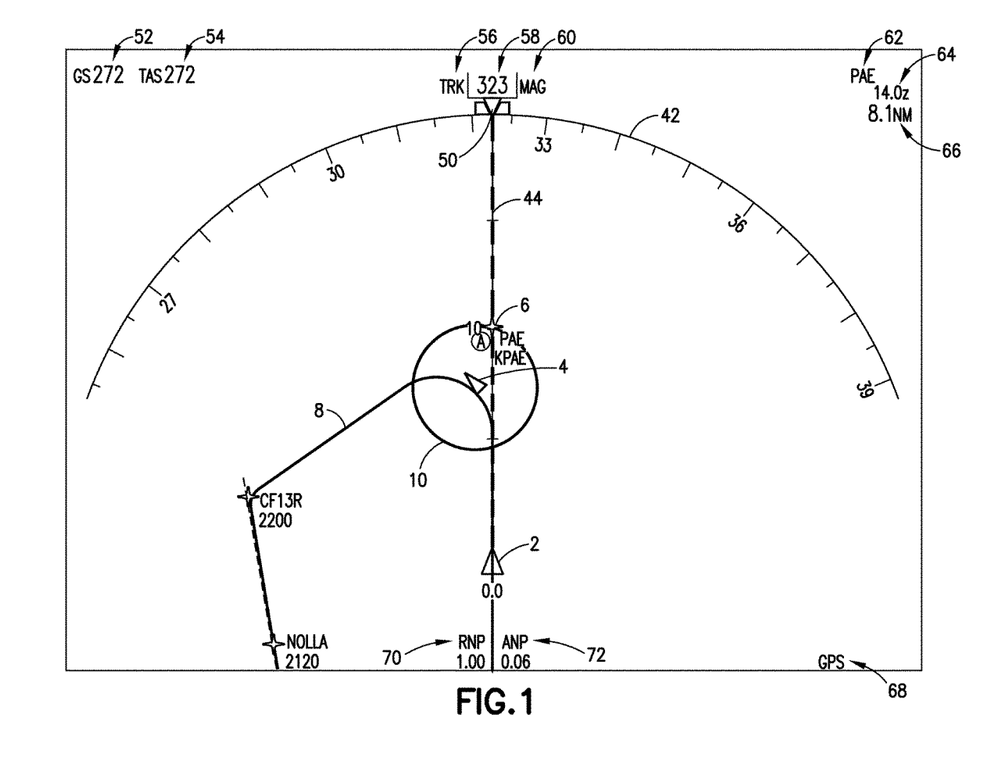
FIG. 1 is a diagram showing one embodiment of a cockpit traffic/navigation display unit onboard a trailing aircraft that is displaying respective triangles indicating the current position of a leading aircraft relative to the current position of the trailing aircraft and a circle representing a specified "no closer than" separation distance or spacing between the leading and trailing aircraft. The circle is centered at and surrounds the triangle that symbolizes the leading aircraft. In the situation depicted in FIG. 1, the spacing between the leading and trailing aircraft is much greater than the separation distance indicated by the circle.

FIG. 1 depicts one mode of a display system used for navigation, surveillance, and guidance purposes. Those skilled in the art will appreciate that FIG. 1 depicts one configuration of many that can be implemented for an embodiment of a shared display system. The display system indicates that the navigation source is GPS 68, the required navigation performance (RNP) value 70 is 1.00, and the actual navigation performance (ANP) 72 is 0.06.

Referring to FIG. 1, those skilled in the art may recognize that the depicted mode of the display system is primarily navigational. Although not shown, the display system can be engaged to display weather systems, terrain, or other data. In the current map mode, the display system shows an expanded compass rose 42, range scale 44, a current heading pointer 50, a triangular ownship symbol 2, ground speed 52, true airspeed 54, current track 58, track-up indication 56, and magnetic reference 60. Furthermore, the display shows an active waypoint 62 (i.e., PAE), an estimated time to active waypoint 64, and a current distance to active waypoint 66. Lastly, still referring to FIG. 1, the surveillance information presented includes a triangular leading aircraft symbol 4, shown ahead of the ownship symbol 2.

The relative positions of the ownship symbol 2 and the leading aircraft symbol 4 indicate the current position of the leading aircraft relative to the current position of the trailing aircraft. The symbol 6 indicates the position of a waypoint. The line 8 indicates the planned or desired path or track of ownship (i.e., the trailing aircraft). The display unit further displays a circle 10 representing a specified "no closer than" separation distance or spacing between the leading and trailing aircraft. In the embodiment depicted in FIG. 1, circle 10 is centered at and surrounds the leading aircraft symbol 4. In the situation depicted in FIG. 1, the spacing between the leading and trailing aircraft is much greater than the separation distance indicated by the circle 10.

As known to persons skilled in the art of cockpit displays, as ownship moves relative to Earth, the position of ownship symbol 2 on the display screen seen in FIG. 1 will not change, but rather any symbols representing waypoints and other symbols representing stationary landmarks will move relative to ownship symbol 2 on the display screen.

The screen of FIG. 1 also displays the leading aircraft symbol 4 which represents a ADS-B equipped aircraft in front of ownship. As previously mentioned, the location of leading aircraft symbol 4 relative to the location of ownship icon 2 generally indicates the current position of the ADS-B equipped aircraft relative to the current position of ownship. A person of ordinary skill in the art will recognize that movement of a particular aircraft icon relative to ownship symbol 2 on the display screen indicates the movement of the corresponding other aircraft relative to ownship, not movement relative to an Earth-based frame of reference. For example, if ownship and the leading aircraft represented by symbol 4 were traveling in parallel at the same speed, the position and orientation of leading aircraft symbol 4 relative to the fixed position of the ownship symbol 2 would not change.

In accordance with the embodiment depicted in FIG. 1, the traffic display system onboard ownship may comprise a plurality of computers or processors connected by a network or bus, hereinafter referred to as a "computer system". This computer system processes traffic data broadcast by other aircraft within the vicinity of ownship. When in a default mode, this computer system causes a traffic display unit (e.g., the cockpit navigation display) to display symbols indicating the current position, current heading/track and current trend of ownship and symbols indicating the relative current positions of other ADS-B-equipped aircraft, as seen in the exemplary screen shot of FIG. 1.

FIG. 1 shows a typical navigation display where the ownship's flight plan is displayed along with other traffic and the leading aircraft is approaching the same runway as ownship or a runway parallel to ownship's runway. Air Traffic Control provides the flight identification of the leading aircraft to the flight crew of ownship for Visual Clearance for approach and landing. Upon the traffic controller's instructions, the flight crew would enter the flight identifier of the leading airplane in an onboard ownship system and a distance for reference that they would like to maintain or not get closer than while flying behind the leading airplane. This display of distance on the traffic/navigation display can be a full circle 10 (dashed or solid line) around the leading aircraft as shown in FIG. 1, or it can be a circular arc (dashed or solid line) behind the leading aircraft between the two aircraft. The flight crew uses this circle or segment thereof for reference for maintaining spacing between the leading aircraft and ownship.

Figure 2:
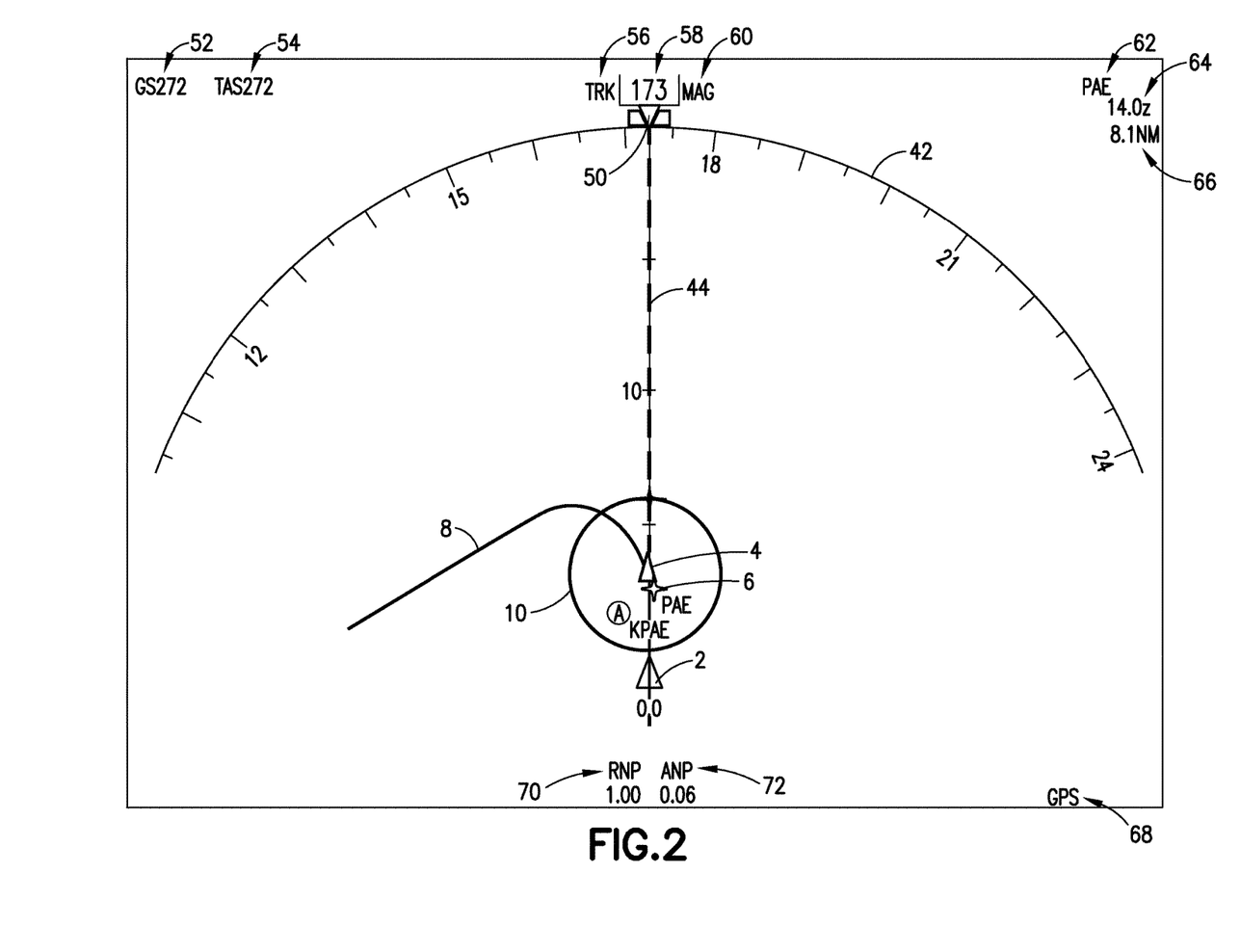
FIG. 2 is a diagram showing the same embodiment shown in FIG. 1, except that the spacing between the leading and trailing aircraft is now almost equal to the separation distance indicated by the circle.

FIG. 2 is a diagram showing the same embodiment shown in FIG. 1, except that the spacing between the leading aircraft and ownship is now almost equal to the separation distance indicated by the circle 10. The symbology displayed in FIG. 2 shows that the ownship is at the distance that was entered in the system by the flight crew. To indicate to the flight crew that the aircraft is at the distance entered by the flight and they should slow down or take whatever action is needed, the system changes the color and/or other attributes of the circle or circular arc.

Figure 3:
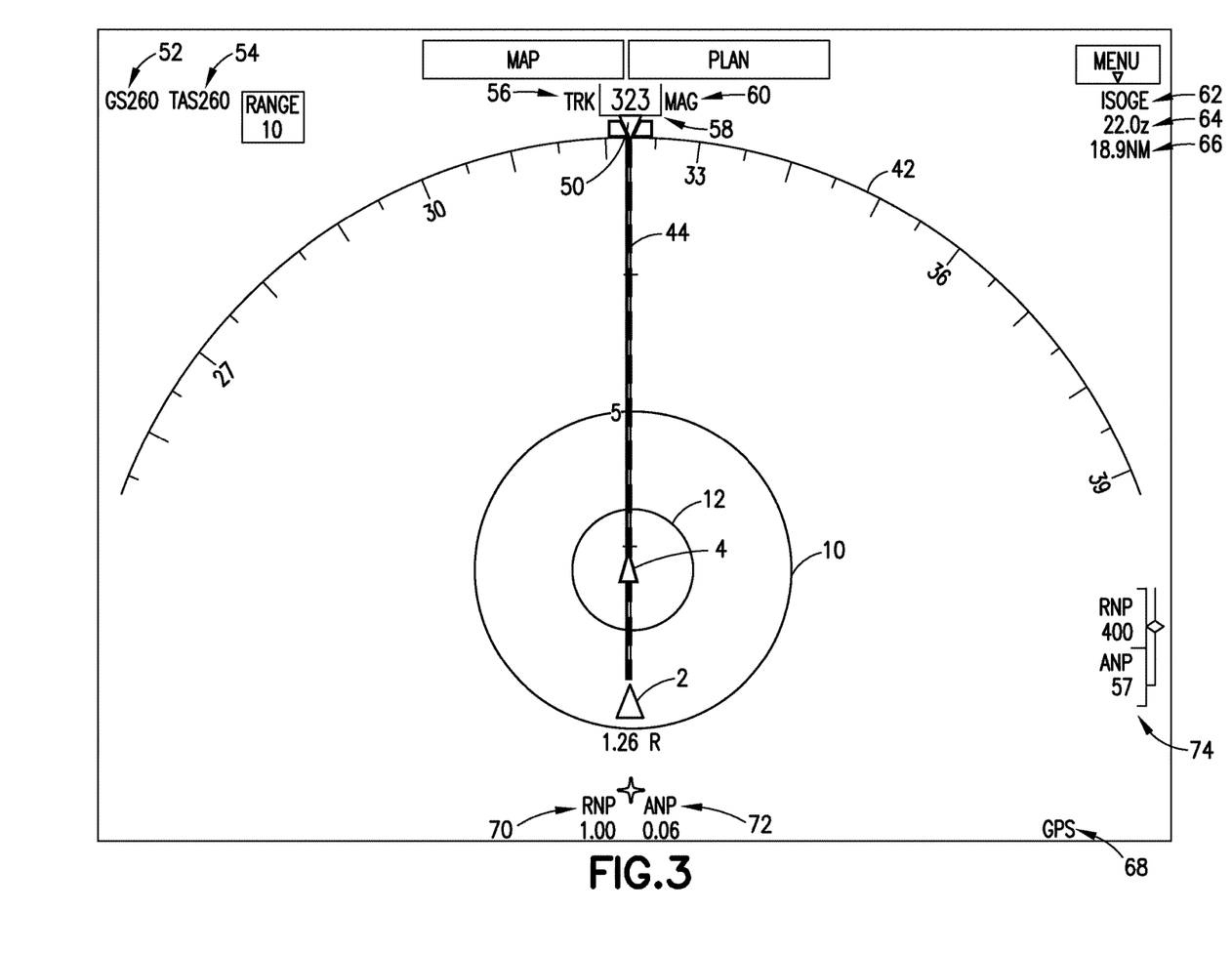
FIG. 3 is a diagram showing another embodiment of a cockpit traffic/navigation display unit onboard a trailing aircraft that is displaying concentric inner and outer circles respectively representing a specified "no closer than" separation distance or spacing and a mandatory minimum separation distance or spacing between the leading and trailing aircraft. The concentric circles are centered at and surround the leading aircraft symbol. In the situation depicted in FIG. 3, the spacing between the leading and trailing aircraft is less than the separation distance indicated by the outer circle but more than the minimum separation distance indicated by the inner circle.

FIG. 3 is a diagram showing another embodiment of a cockpit traffic/navigation display unit onboard a trailing aircraft (also referred to herein as "ownship") that is displaying a circle 10 representing a specified "no closer than" separation distance or spacing and a circle 12 representing a mandatory minimum separation distance or spacing between the leading and trailing aircraft. Circle 12 is displayed concentric with and surrounded by circle 10. The concentric circles 10 and 12 are centered at and surround the leading aircraft symbol 4. In the situation depicted in FIG. 3, the spacing between the leading and trailing aircraft is less than the separation distance indicated by circle 10 but more than the separation distance indicated by the circle 12. The display screen depicted in FIG. 3 includes all of the elements that were included in FIG. 1, plus a vertical ANP-RNP bar 74.

In FIG. 3, if the ownship's speed is high and it will get to the minimum distance allowed behind the leading aircraft in, e.g., 20 seconds, the system would display the circle 12 (or a circular arc) at the minimum safe spacing to indicate to the flight crew that if they do not slow down, they will be at the minimum distance allowed (also referred to herein as "minimum safe spacing) behind the leading aircraft soon (in this example, 20 seconds). This display of circle 12 can be used as a heads-up indication for the flight crew.

If the flight crew slows down the ownship such that there is no closure rate between the two aircraft, the system would remove circle 12 and if the flight crew slows down further to increase the spacing between the two aircraft to the initial spacing (indicated by circle 10) that the flight crew had intended to maintain, the system would change the attributes of circle 10 to the original attribute (change color back to green in this example) as shown in FIG. 1.

Figure 4:
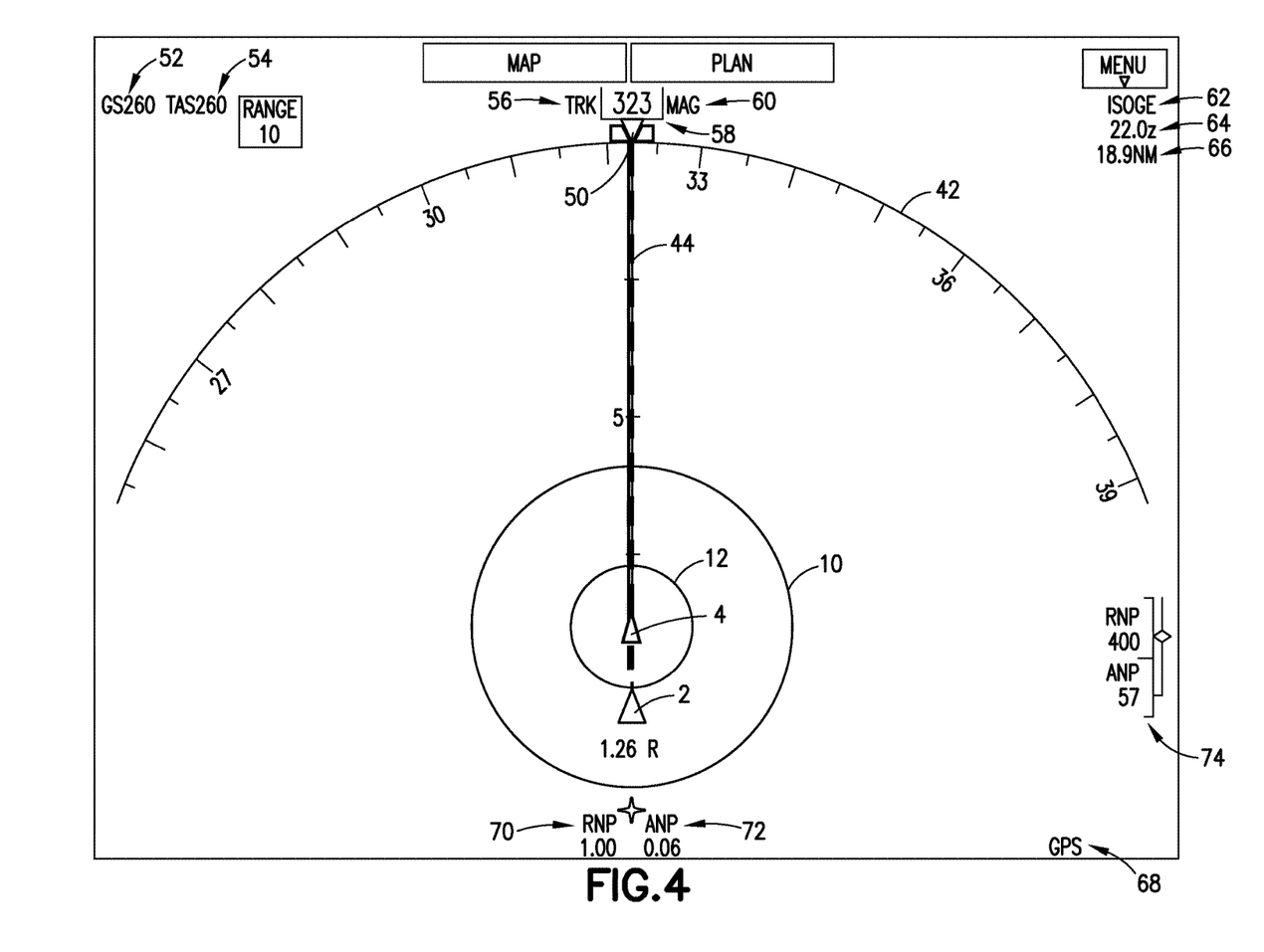
FIG. 4 is a diagram showing the same embodiment shown in FIG. 3, except that the spacing between the leading and trailing aircraft is now equal to the mandatory minimum separation distance indicated by the inner circle.

If the flight crew does not slow down and reaches the minimum distance allowed behind the leading aircraft as shown in FIG. 4, the system would generate an aural alert to get flight crew's attention notifying that they are at the minimum distance allowed and they need to take some action immediately. The system can also change attributes of both circles (or circular arcs), e.g., change color to red.

Figure 5:
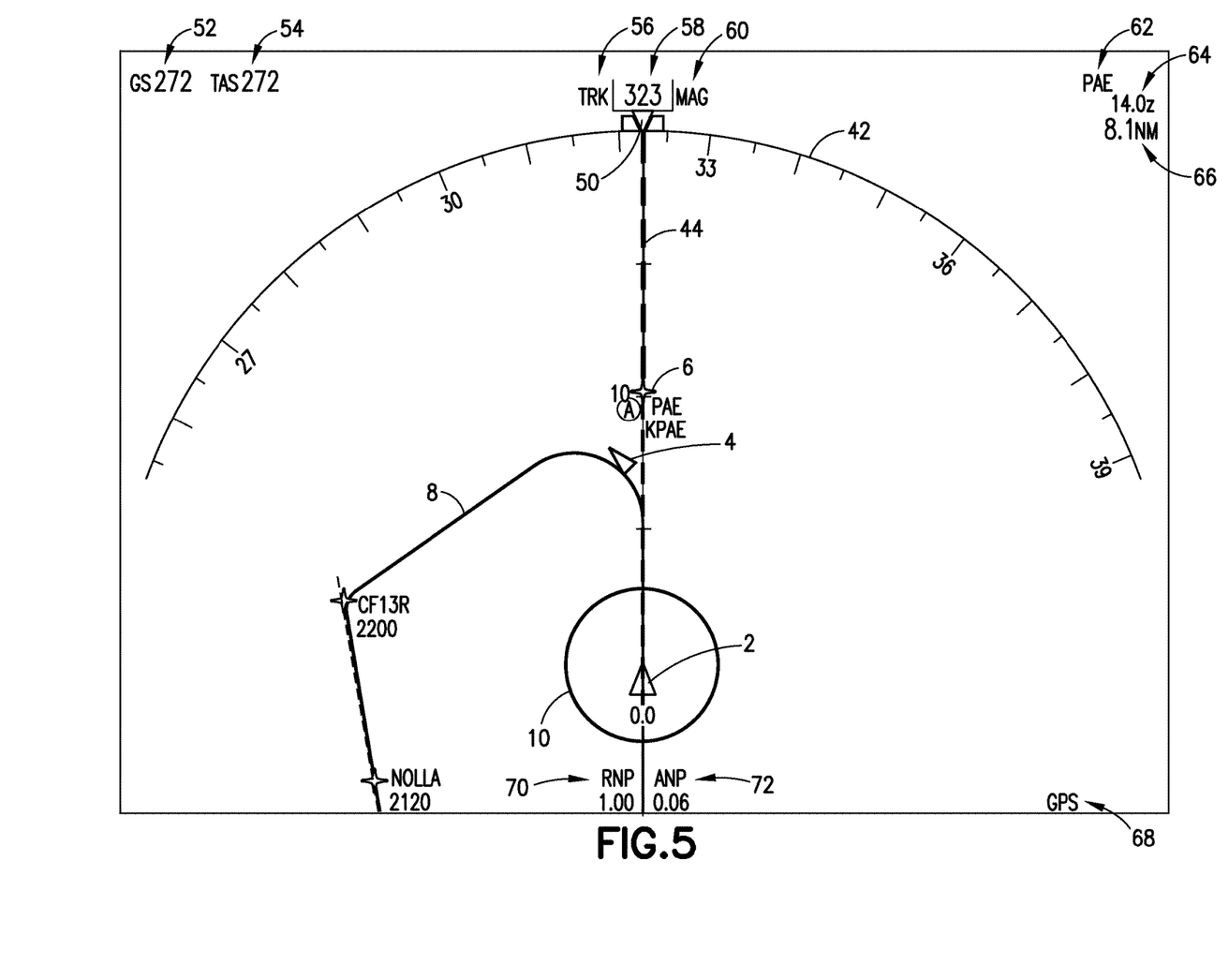
FIG. 5 is a diagram showing a further embodiment of a cockpit traffic/navigation display unit onboard a trailing aircraft that is displaying respective triangles indicating the current position of a leading aircraft relative to the current position of the trailing aircraft and a circle representing a specified "no closer than" separation distance or spacing between the leading and trailing aircraft. The circle is centered at and surrounds the triangle indicating the current position of the trailing aircraft. In the situation depicted in FIG. 5, the spacing between the leading and trailing aircraft is much greater than the separation distance indicated by the circle.
Figure 6:
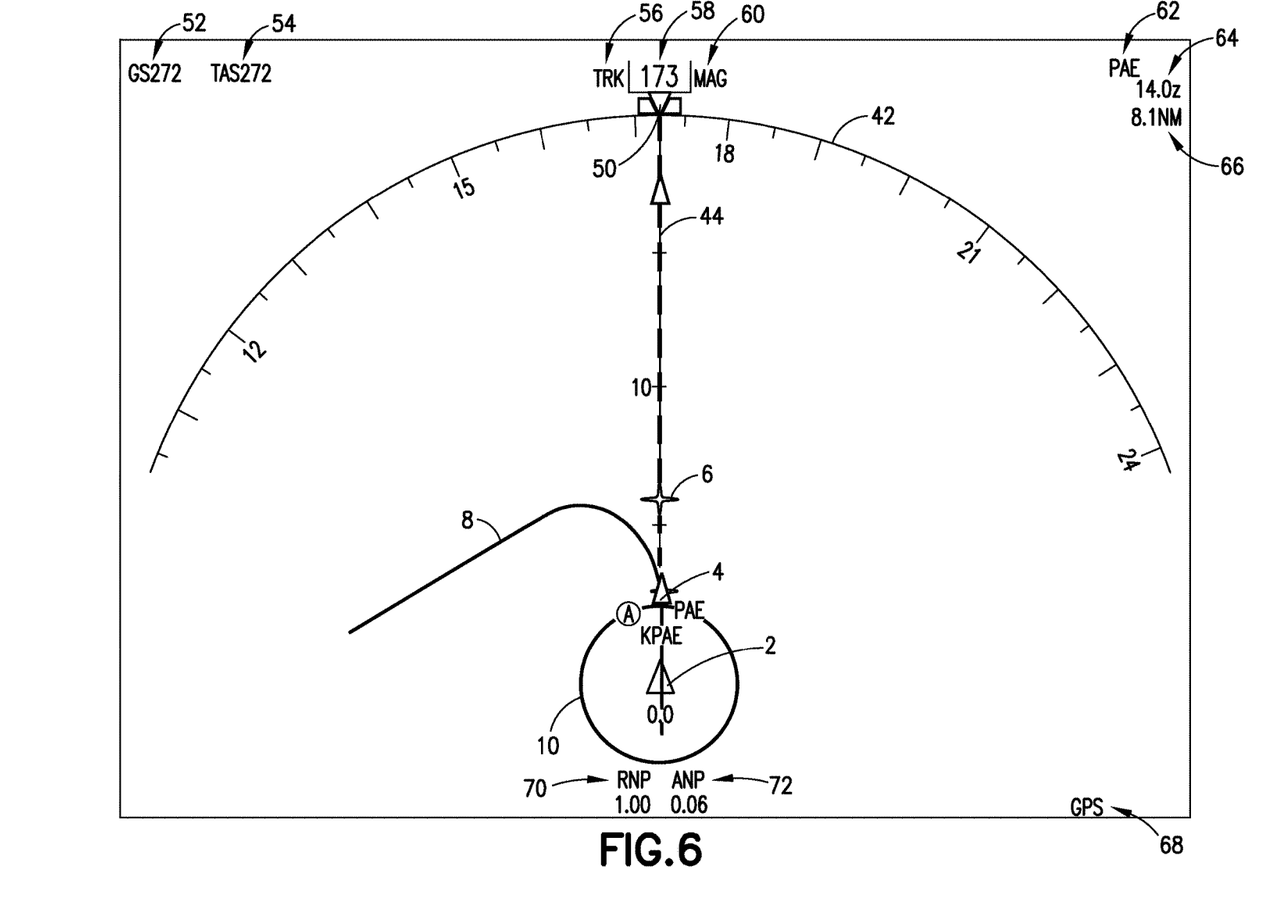
FIG. 6 is a diagram showing the same embodiment shown in FIG. 5, except that the spacing between the leading and trailing aircraft is now equal to the separation distance indicated by the circle.

As shown in FIGS. 5 and 6, the system could also display the circle 10 around the ownship symbol 2 instead of around the leading aircraft symbol 4 and follow the same logic for changing attributes.

FIG. 5 is a diagram showing a further embodiment of a cockpit traffic/navigation display unit onboard a trailing aircraft that is displaying a triangular ownship symbol 2 and a triangular leading aircraft symbol 4 that indicate the current position of the leading aircraft relative to the current position of the trailing aircraft and a circle 10 representing a specified "no closer than" separation distance or spacing between the leading and trailing aircraft. The circle 10 is centered at and surrounds the ownship symbol 2 indicating the current position of the trailing aircraft. In the situation depicted in FIG. 5, the spacing between the leading and trailing aircraft is much greater than the separation distance indicated by the circle 10.

FIG. 6 is a diagram showing the same embodiment shown in FIG. 5, except that the spacing between the leading and trailing aircraft is now equal to the separation distance indicated by the circle 10.

Figure 7:
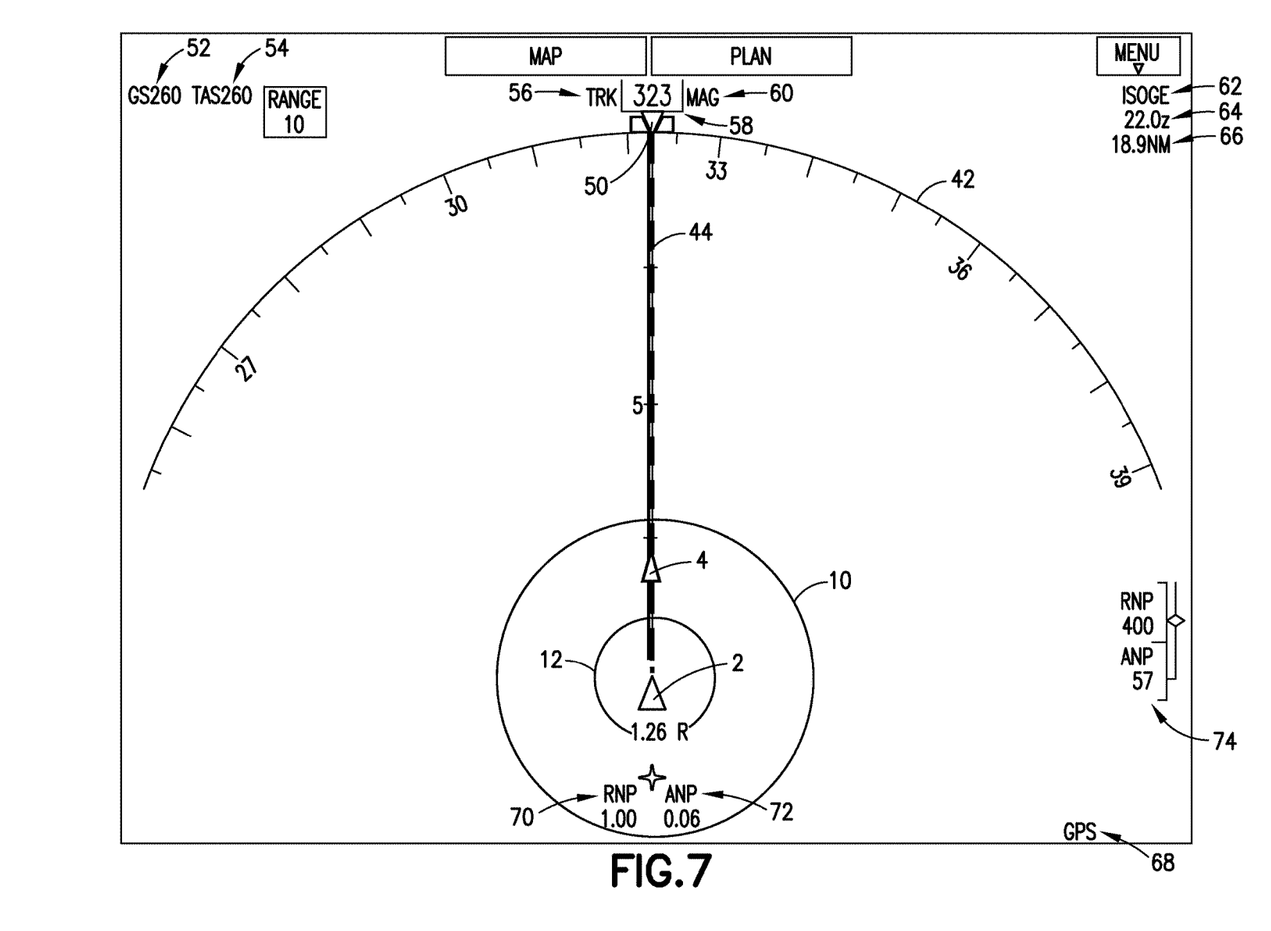
FIG. 7 is a diagram showing another embodiment of a cockpit traffic/navigation display unit onboard a trailing aircraft that is displaying concentric inner and outer circles respectively representing a specified "no closer than" separation distance or spacing and a mandatory minimum separation distance or spacing between the leading and trailing aircraft. The concentric circles are centered at and surround the trailing aircraft symbol. In the situation depicted in FIG. 7, the spacing between the leading and trailing aircraft is less than the separation distance indicated by the outer circle but more than the minimum separation distance indicated by the inner circle.
Figure 8:
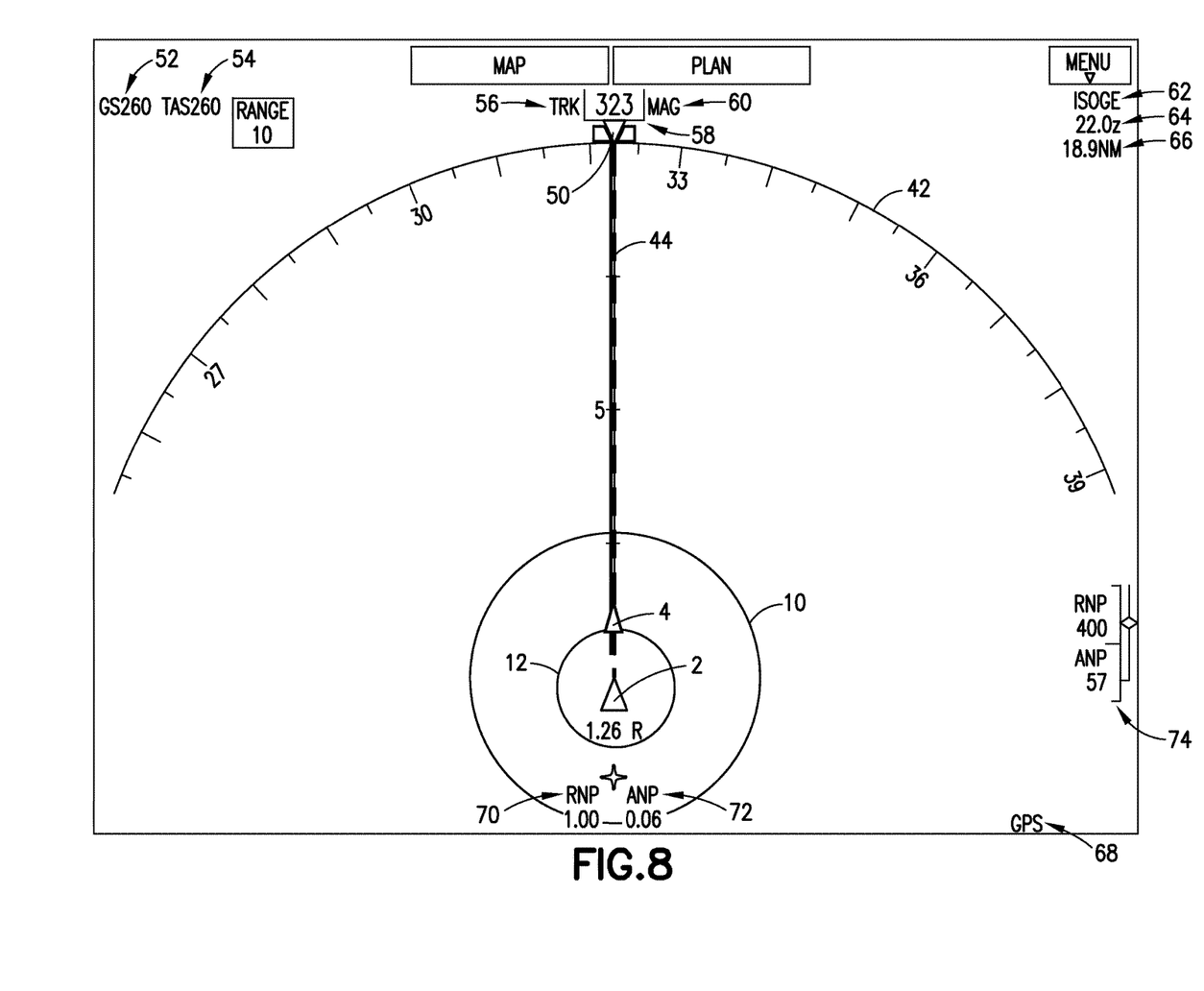
FIG. 8 is a diagram showing the same embodiment shown in FIG. 7, except that the spacing between the leading and trailing aircraft is now equal to the mandatory minimum separation distance indicated by the inner circle.

As shown in FIGS. 7 and 8, the system could also display the concentric circles 10 and 12 around the ownship symbol 2 instead of around the leading aircraft symbol 4 and follow the same logic for changing attributes and providing an aural (or other) alert as described above.

FIG. 7 is a diagram showing another embodiment of a cockpit traffic/navigation display unit onboard a trailing aircraft that is displaying concentric circles 10 and 12 respectively representing a specified "no closer than" separation distance or spacing and a mandatory minimum separation distance or spacing between the leading and trailing aircraft. The concentric circles 10 and 12 are centered at and surround the ownship symbol 2. In the situation depicted in FIG. 7, the spacing between the leading and trailing aircraft is less than the separation distance indicated by the circle 10 but more than the minimum separation distance indicated by the circle 12.

FIG. 8 is a diagram showing the same embodiment shown in FIG. 7, except that the spacing between the leading and trailing aircraft is now equal to the mandatory minimum separation distance indicated by the circle 12.

Figure 9:
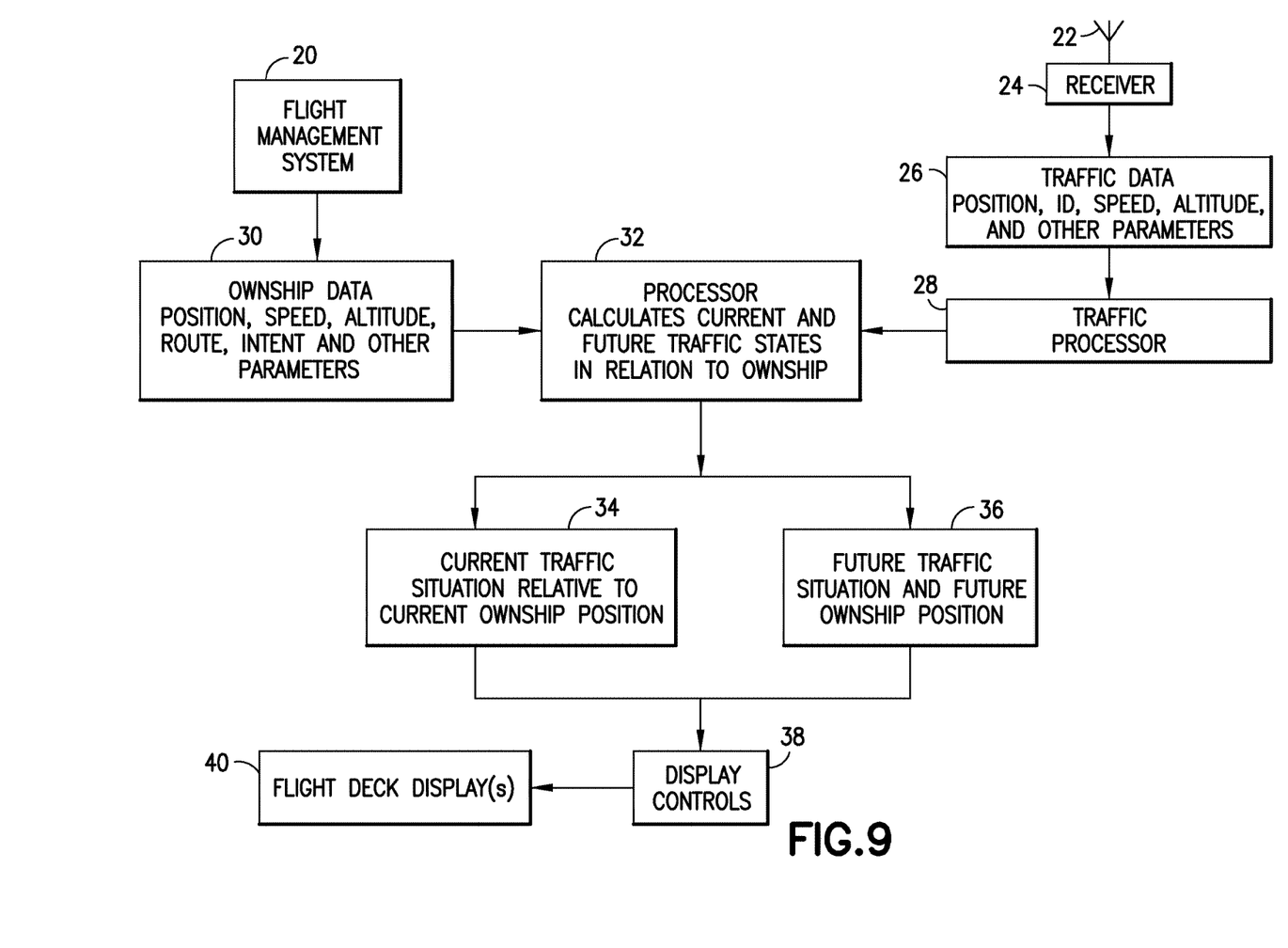
FIG. 9 is a hybrid block diagram/flowchart showing a system and a method in accordance with one embodiment for displaying (e.g., on a navigation display) respective symbols representing current positions of at least ownship and a leading aircraft and at least one additional symbol representing a threshold separation distance between the leading aircraft and ownship.

FIG. 9 is a hybrid block diagram/flowchart showing a system and a method in accordance with one embodiment for displaying (e.g., on a navigation display) respective symbols representing current positions of at least ownship and a leading aircraft and at least one additional symbol representing a threshold separation distance between the leading aircraft and own ship.

More specifically, FIG. 9 shows a system for displaying traffic symbols on one or more flight deck displays 40 based on traffic information broadcast by other aircraft. The system has an antenna 22 for converting traffic data signals broadcast by aircraft (e.g., TCAS and ADS-B traffic information) located within range of ownship into electrical signals, which are received by a receiver 24. The receiver outputs broadcast traffic data 26 to a traffic processor 28. The broadcast traffic data 26 includes the following information for each broadcasting ADS-B-equipped aircraft: identity, longitude and latitude, altitude, groundspeed, and other parameters, which information is broadcast every second. All of the received traffic data is processed by a traffic processor 28, which filters and stores the traffic data and then continually sends signals representing that traffic data to a processor 32. The processor 32 onboard ownship is programmed to calculate the heading/track and climb/descend rate of the other aircraft based on the stream of position information (e.g., latitude, longitude and altitude) received from that aircraft.

The processor 32 also receives ownship data 30 from a flight management system 20 onboard ownship. This ownship data may include information concerning the longitude, latitude, heading and track, groundspeed, altitude, climb/descend rate, route, maneuver occurrence, and other parameters. Based on the available traffic information, the processor 32 calculates the current traffic states of other aircraft relative to the current traffic state of ownship (block 34 in FIG. 9). In a default display mode, the processor 32 converts the results of the calculations of current traffic states into the proper format for display as a page of graphical data on the traffic display screen (see, e.g., FIG. 1). In a future ownship position display mode, the processor 32 calculates the future traffic states of other aircraft relative to the future traffic states of ownship. Based on the future traffic states of ownship, the processor calculates a future (i.e., predicted) separation distance between the leading and trailing aircraft) (block 36 in FIG. 9). The processor 32 converts the results of those calculations into the proper format for display as a page of graphical data on the traffic display screen that further includes at least one circular ring or arc representing a threshold separation distance. The flight crew is provided with an interface (not shown in FIG. 9), e.g., a rotatable knob or buttons, for selecting the display mode. The page of graphical data for the selected display mode is inputted to a display controller 38, which controls what page is displayed on the flight deck display(s) 40 as a function of the flight crew selection.

The processor 32 is programmed to execute algorithms that determine the extrapolated positions and other parameters of ownship and other aircraft within ownship's display range. The extrapolated position of an aircraft can be readily calculated based on information such as the current position, heading and track, groundspeed, altitude, climb/descend rate, bank angle and maneuver of the aircraft, its rate of change of heading, and the wind speed and direction, using well-known equations of motion and geometric and trigonometric relationships. For example, the processor 32 may perform the following operations: (a) calculate a future position and a future heading/track of ownship that would result were ownship to continue to fly from its current position at its current climb/descend rate, current groundspeed and current bank angle for a specified time or distance; (b) calculate possible future positions of ownship were ownship to fly from its current position on its current heading/track at different possible bank angles for the specified time or distance; and (c) calculate a future position of another aircraft that would result were that other aircraft to continue to fly from its current position with its current heading, current climb rate and current groundspeed for the specified time or the time it will take for ownship to fly the specified distance.

The processor 32 is further programmed to execute a conflict detection algorithm that uses the calculated future position and future heading/track information for ownship and another aircraft within ownship's display range. One embodiment of that conflict detection algorithm includes the following operations: (a) determine whether there would be a conflict between ownship and the other aircraft were they located at their respective calculated future positions; and (b) determine whether a loss of separation between the first and leading aircraft will occur were they to continue on their respective predicted flight paths after reaching their respective calculated future positions.

If the other aircraft, at its future position, will be within the protected volume of airspace surrounding the future ownship position, then the processor 32 can execute a loss of separation detection algorithm that utilizes the heading/vertical rate/closure rate of the other aircraft to determine whether a loss of separation between ownship and the other aircraft will occur. If the processor 32 determines that a loss of separation will occur in the future, the processor can immediately generate a Resolution Advisory. Algorithms for detecting a loss of separation between two aircraft are well known. One such algorithm involves computing the separation between the flight paths of ownship and another aircraft for each future position of ownship along its flight path and then comparing successive separation values to a specified threshold. When the calculated future separation falls below the specified threshold, then the processor 32 can predict that a loss of separation will occur at the time when ownship will arrive at its future position corresponding to the below-threshold future separation.

In accordance with the embodiment shown in FIG. 9, the processor 32 also generates display data. Alternatively, this function could be performed by a separate display processor. In either case, a visual/graphical air traffic display software tool running on the processor can be configured to generate display data of the types depicted in FIGS. 1-8 by executing the following operations: controlling the display unit to display a first symbol that indicates a pilot-selected separation distance between a leading aircraft and a trailing aircraft; monitoring current and predicted separation distances of the leading and trailing aircraft; and using the current and predicted separation distances of the leading and trailing aircraft to issue the following alerts: (1) a first alert when the current separation distance of the leading and trailing aircraft decreases sufficiently that the current separation distance differs from the pilot-selected separation distance by less than a first specified threshold; (2) a second alert when the current separation distance is decreasing at a sufficiently fast rate that a minimum separation distance less than the pilot-selected separation distance will be reached within a specified time interval; and (3) a third alert when the current separation distance decreases sufficiently that it differs from the minimum separation distance by less than a second specified threshold. The issuing of the second alert comprises controlling the display unit to display a second symbol that indicates the minimum separation distance. The first alert may take the form of a change in the coloration of the first symbol, and the third alert may take the form of an aural alert.

Figure 10:
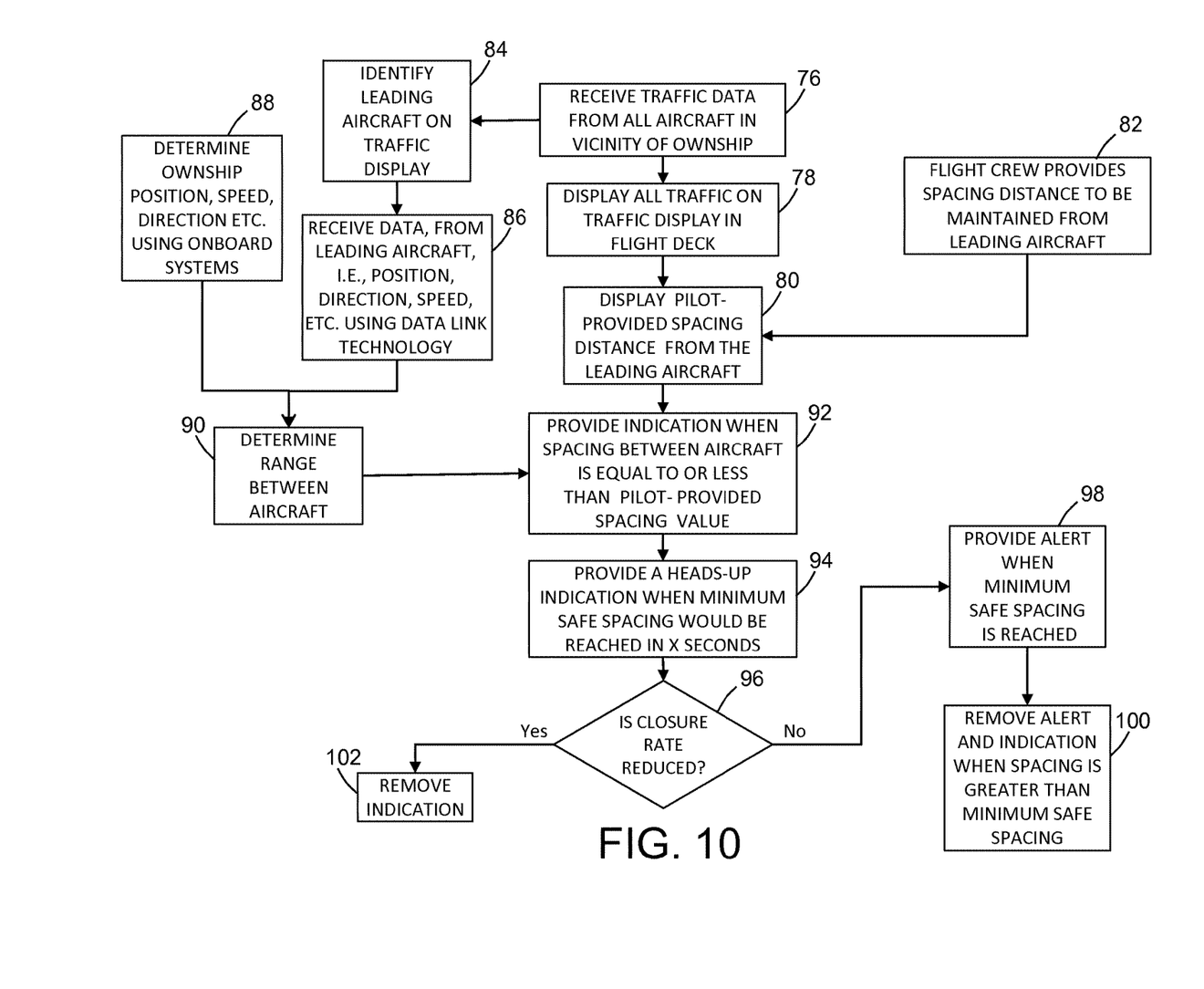
FIG. 10 is a flowchart identifying some steps of a method in accordance with one embodiment for monitoring the spacing between a leading aircraft and a trailing aircraft and the rate at which that spacing is decreasing (referred to herein as "the closure rate") and issuing appropriate alerts when specified conditions are satisfied.

FIG. 10 is a flowchart identifying some steps of an algorithm for monitoring the spacing between a leading aircraft and a trailing aircraft and the rate at which that spacing is decreasing (referred to herein as "the closure rate") and issuing appropriate alerts when specified conditions are satisfied. In accordance with one embodiment, ownship receives traffic data from all aircraft in the vicinity of ownship (step 76). Symbology representing all traffic in the vicinity of ownship is displayed on a traffic display unit in the flight deck of ownship (step 78). Using a flight identifier for a leading aircraft (received from Air Traffic Control and input by ownship's flight crew), the processor controlling the traffic display unit onboard ownship identifies the leading aircraft on the traffic display unit (step 84). Ownship's flight crew then provides a separation or spacing distance to be maintained from that leading aircraft (step 82), which separation or spacing distance is then displayed (using a circle or circular segment, for example) on the traffic display unit (step 80). In addition, a communications system onboard ownship receives data (e.g., current position, heading and speed) from that leading aircraft using ADS-B/datalink technology (step 86), while a flight management computer onboard ownship determines the current position, heading, speed etc. of ownship (step 88). A processor onboard ownship then calculates the range (i.e., spacing) between ownship and the leading aircraft (step 90) using the acquired data. The processor then compares the pilot-selected separation distance and the calculated range and controls the traffic display unit to display an indication when the spacing between ownship and the leading aircraft is equal to or less than the pilot-selected separation distance (step 92). In the event that ownship continues to get closer to the leading aircraft, the processor then controls the traffic display unit to display a heads-up indication when a minimum safe spacing would be reached in X (e.g., 20) seconds (step 94). During subsequent operation, the processor monitors whether the closure rate has been reduced (step 96). If the closure rate has been reduced, then the indication displayed in step 94 is removed (step 102). If the closure rate has not been reduced, then the processor will activate an alert when the range calculated in step 90 equals the minimum safe spacing (step 98). The indication displayed in step 94 and the alert generated in step 98 will be removed if the calculated range becomes greater than the minimum safe spacing (step 100).

While traffic display systems have been described with reference to various embodiments, it will be understood by those skilled in the art that various changes may be made and equivalents may be substituted for elements thereof without departing from the scope of the claims appended hereto. In addition, many modifications may be made to adapt the teachings herein to a particular situation without departing from the scope thereof. Therefore it is intended that the claims not be limited to the particular embodiments disclosed.

Many embodiments of the system described above may take the form of computer-executable instructions, such as routines executed by a programmable computer. Those skilled in the relevant art will appreciate that the traffic display scheme disclosed herein can be practiced on other computer system configurations as well. The computer system can be embodied in a special-purpose computer or data processor that is specifically programmed, configured or constructed to perform one or more of the computer-executable instructions described herein. Accordingly, the term "computer" as generally used herein includes any processor and can include Internet appliances, hand-held devices (including palm-top computers, wearable computers, cellular or mobile phones, multiprocessor systems, processor-based or programmable consumer electronics, mini-computers and the like).

The traffic display scheme disclosed herein can also be practiced in distributed computing environments, where tasks or modules are performed by remote processing devices that are linked through a communications network. In a distributed computing environment, program modules or subroutines may be located in both local and remote memory storage devices. Aspects of the system described above may be stored or distributed on computer-readable media, including magnetic or optically readable computer disks (e.g., removable disks), as well as distributed electronically over networks. Data structures and transmissions of data particular to aspects of the disclosed system are also encompassed within the scope of the claims appended hereto. Furthermore, the separation distance display information disclosed herein can be presented on displays or display media, for example, CRT screens, LCD screens or other suitable devices.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising at least one processing unit (e.g., a central processing unit, an integrated circuit or an arithmetic logic unit).

As used in the claims, the term "curved line" should be construed broadly to encompass at least the following: curved continuous lines, and series of spaced line segments or points arranged along a curved path.

As used in the claims, the term "position" means a position in three-dimensional space. For example, the position of an aircraft may comprise a latitude, a longitude and an altitude.

The method claims set forth hereinafter should not be construed to require that the steps recited therein be performed in alphabetical order or in the order in which they are recited. Nor should they be construed to exclude some portions of two or more steps being performed concurrently.

The invention claimed is:

1. A method for displaying traffic information on a traffic display unit onboard a trailing aircraft, comprising:
    (a) operating a pilot interface to select a magnitude of a reference separation distance;
    (b) acquiring data representing a current position and a current heading of the trailing aircraft;
    (c) acquiring data representing a current position and a current heading of a leading aircraft flying in front of the trailing aircraft;
    (d) displaying first symbology that indicates the current position and current heading of the leading aircraft relative to a frame of reference;
    (e) displaying second symbology that indicates the current position and current heading of the trailing aircraft relative to the frame of reference;
    (f) displaying third symbology representing a reference separation distance between the leading and trailing aircraft;
    (g) calculating a current separation distance between the leading and trailing aircraft based on the current positions of the leading and trailing aircraft; and
    (h) generating an alert in response to the current separation distance calculated in step (g) being within a specified tolerance of the reference separation distance.

2. The method as recited in claim 1, wherein the alert is a visible change to the displayed information.

3. The method as recited in claim 2, wherein the visible change comprises a change in coloration of the third symbology.

4. The method as recited in claim 1, wherein the alert is an aural alert.

5. The method as recited in claim 1, wherein the third symbology comprises a curved line.

6. The method as recited in claim 5, wherein the curved line is a circle or circular segment centered at one of the first and second symbologies.

7. The method as recited in claim 1, further comprising:
    (i) calculating a difference between the reference separation distance and the current separation distance calculated in step (f); and
    (j) comparing the difference calculated in step (h) to the specified threshold.

8. The method as recited in claim 7, wherein step (h) comprises generating the alert in response to the difference calculated in step (i) being one of the following: equal to zero or nearly equal to zero.

9. The method as recited in claim 1, wherein step (h) comprises generating the alert in response to the current separation distance calculated in step (g) becoming one of the following: equal to or less than the reference separation distance.

10. A method for displaying traffic information on a traffic display unit onboard a trailing aircraft, comprising:
   (a) acquiring data representing a current position, a current speed and a current heading of the trailing aircraft;
   (b) acquiring data representing a current position, a current speed and a current heading of a leading aircraft flying in front of the trailing aircraft;
   (c) displaying first symbology that indicates the current position and current heading of the leading aircraft relative to a frame of reference;
   (d) displaying second symbology that indicates the current position and current heading of the trailing aircraft relative to the frame of reference;
   (e) displaying third symbology representing a first reference separation distance between the leading and trailing aircraft;
   (f) calculating a future time at which a future separation distance between the leading and trailing aircraft will be equal to a second reference separation distance less than the first reference separation distance based on the current positions and current speeds of the leading and trailing aircraft; and
   (g) generating an alert in response to the future time calculated in step (f) being less than a specified tolerance.

11. The method as recited in claim 10, wherein step (g) comprises displaying fourth symbology representing the second reference separation distance.

12. The method as recited in claim 11, wherein the fourth symbology comprises a curved line.

13. The method as recited in claim 12, wherein the curved line is a circle or circular segment centered at one of the first and second symbologies.

14. A system for displaying traffic information onboard a trailing aircraft, comprising a pilot interface, a display unit and a computer system configured to perform the following operations:
   (a) acquiring data representing a current position and a current heading of the trailing aircraft;
   (b) acquiring data representing a current position and a current heading of a leading aircraft flying in front of the trailing aircraft;
   (c) causing said display unit to display first symbology that indicates the current position and current heading of the leading aircraft relative to a frame of reference;
   (d) causing said display unit to display second symbology that indicates the current position and current heading of the trailing aircraft relative to the frame of reference;
   (e) causing said display unit to display third symbology representing a reference separation distance between the leading and trailing aircraft having a magnitude that was selected by operation of said pilot interface;
   (f) calculating a current separation distance between the leading and trailing aircraft based on the current positions of the leading and trailing aircraft; and
   (g) causing an alert to be generated in response to the current separation distance calculated in operation (f) being within a specified tolerance of the reference separation distance.

15. The system as recited in claim 14, wherein the alert is a change in coloration of the third symbology.

16. The system as recited in claim 14, wherein the third symbology comprises a circle or circular segment centered at one of the first and second symbologies.

17. A system for displaying traffic information onboard a trailing aircraft, comprising a display unit and a computer system configured to perform the following operations:
   (a) acquiring data representing a current position, a current speed and a current heading of the trailing aircraft;
   (b) acquiring data representing a current position, a current speed and a current heading of a leading aircraft flying in front of the trailing aircraft;
   (c) causing said display unit to display first symbology that indicates the current position and current heading of the leading aircraft relative to a frame of reference;
   (d) causing said display unit to display second symbology that indicates the current position and current heading of the trailing aircraft relative to the frame of reference;
   (e) causing said display unit to display third symbology representing a first reference separation distance between the leading and trailing aircraft;
   (f) calculating a future time at which a future separation distance between the leading and trailing aircraft will be equal to a second reference separation distance less than the first reference separation distance based on the current positions and current speeds of the leading and trailing aircraft; and
   (g) causing an alert to be generated in response to the future time calculated in operation (f) being less than a specified tolerance.

18. The system as recited in claim 17, wherein operation (g) comprises displaying fourth symbology representing the second reference separation distance.

19. The system as recited in claim 18, wherein the fourth symbology comprises a circle or circular segment centered at one of the first and second symbologies.

20. A system for displaying traffic information onboard a trailing aircraft, comprising a display unit, a computer system configured to control said display unit, and a visual/graphical air traffic display software tool running on said computer system and configured to perform the following operations:
   controlling said display unit to display a first symbol that indicates a pilot-selected separation distance between a leading aircraft and a trailing aircraft;
   monitoring current and predicted separation distances of the leading and trailing aircraft; and
   using the current and predicted separation distances of the leading and trailing aircraft to issue the following alerts:
   a first alert when the current separation distance of the leading and trailing aircraft decreases sufficiently that the current separation distance differs from the pilot-selected separation distance by less than a first specified threshold;
   a second alert when the current separation distance is decreasing at a sufficiently fast rate that a minimum separation distance less than the pilot-selected separation distance will be reached within a specified time interval; and
   a third alert when the current separation distance decreases sufficiently that it differs from the minimum separation distance by less than a second specified threshold, wherein said issuing of said second alert comprises controlling said display unit to display a second symbol that indicates the minimum separation distance.

21. The system as recited in claim 20, wherein the first alert takes the form of a change in the coloration of the first symbol, and the third alert takes the form of an aural alert.

* * * * *